(12) United States Patent
Chojnacki et al.

(10) Patent No.: US 9,975,208 B1
(45) Date of Patent: May 22, 2018

(54) ALLOY FOR CAST IRON REPAIR

(71) Applicant: Caterpillar Inc., Peoria, IL (US)

(72) Inventors: Tomasz J. Chojnacki, Peoria, IL (US); Deven John Efta, Grand Forks, ND (US); Mark D. Veliz, Metamora, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days. days.

(21) Appl. No.: 15/380,703

(22) Filed: Dec. 15, 2016

(51) Int. Cl.
| | |
|---|---|
| *C22C 19/00* | (2006.01) |
| *B32B 15/04* | (2006.01) |
| *B21K 1/40* | (2006.01) |
| *B23K 35/00* | (2006.01) |
| *B60B 27/00* | (2006.01) |
| *B23K 35/30* | (2006.01) |
| *C22C 19/05* | (2006.01) |
| *C22C 19/03* | (2006.01) |
| *B21C 35/04* | (2006.01) |

(Continued)

(52) U.S. Cl.
CPC .......... *B23K 35/304* (2013.01); *B21C 33/004* (2013.01); *B21C 35/04* (2013.01); *B21K 1/40* (2013.01); *B32B 15/015* (2013.01); *B32B 15/04* (2013.01); *B32B 15/043* (2013.01); *B32B 15/18* (2013.01); *B60B 1/08* (2013.01); *B60B 3/06* (2013.01); *C22C 19/00* (2013.01); *C22C 19/03* (2013.01); *C22C 19/05* (2013.01); *C22C 19/057* (2013.01); *C22C 19/058* (2013.01); *B60B 27/00* (2013.01); *B60B 2310/60* (2013.01); *B60B 2360/10* (2013.01); *B60B 2900/321* (2013.01); *Y10T 29/49908* (2015.01); *Y10T 428/12576* (2015.01); *Y10T 428/12625* (2015.01); *Y10T 428/12937* (2015.01); *Y10T 428/12944* (2015.01); *Y10T 428/12972* (2015.01); *Y10T 428/12979* (2015.01); *Y10T 428/12993* (2015.01)

(58) Field of Classification Search
CPC ......... C22C 19/00; C22C 19/03; C22C 19/05; C22C 19/057; C22C 19/058; Y10T 428/12944; Y10T 428/12937; Y10T 428/12972; Y10T 428/12979; Y10T 428/12993; Y10T 428/12576; Y10T 428/12625; Y10T 29/49908; B32B 15/015; B32B 15/04; B32B 15/043; B32B 15/18; B21C 33/004; B21C 35/04; B21K 1/40; B60B 1/08; B60B 3/06; B60B 27/00; B60B 2360/10; B60B 2310/60; B60B 2900/321; B23K 35/304
See application file for complete search history.

(56) References Cited

U.S. PATENT DOCUMENTS

| | | | |
|---|---|---|---|
| 5,082,625 A * | 1/1992 | Kato | B23K 35/3033 420/453 |
| 9,005,767 B2 | 4/2015 | Cacace | |
| 2016/0325372 A1 | 11/2016 | Grigorenko et al. | |

FOREIGN PATENT DOCUMENTS

| | | |
|---|---|---|
| GB | 1083432 | 9/1967 |
| JP | 2007-050446 | 1/2007 |

* cited by examiner

*Primary Examiner* — Michael E. La Villa
(74) *Attorney, Agent, or Firm* — Finnegan, Henderson, Farabow, Garrett & Dunner, LLP (57) ABSTRACT

An alloy for cladding cast iron is disclosed. The alloy may include on a weight basis, about 6.2% to about 9.3% of chromium (Cr), about 3.0% to about 4.5% of iron (Fe), about 1.4% to about 2.15% of silicon (Si), about 0.5% to about 0.8% of boron (B), about 0.1% of carbon (C), and a balance of nickel (Ni) and incidental impurities.

17 Claims, 5 Drawing Sheets

(51) Int. Cl.
  *B32B 15/18* (2006.01)
  *B32B 15/01* (2006.01)
  *B21C 33/00* (2006.01)
  *B60B 1/08* (2006.01)
  *B60B 3/06* (2006.01)

ALLOY FOR CAST IRON REPAIR

TECHNICAL FIELD

The present disclosure relates generally to an alloy, and, more particularly, to an alloy for cast iron repair.

BACKGROUND

Machines, for example, construction or mining equipment typically include traction devices that help the machines to move about a work area. In many cases, the traction devices include one or more wheels attached to one or more axles. A wheel in turn may be attached to a rim of a tire, using bolts arranged in a generally circular pattern around a rim of the wheel. As a result, the wheels transfer the full load of the machine to the bolts.

The wheels are typically made of cast metal, for example, cast iron. During operation of the machine, portions of the wheels that are connected to the rims may experience significant wear caused due to fretting of material as the bolted joints relax, or due to a mismatch of material properties between the wheel and the rim of the tire. Excessive wear may prevent the wheel from being correctly attached to the rim of the tire. In some instances, continuous use of the wheels may lead to formation of cracks in the wheel, making the wheel unusable. Therefore, it may be desirable to repair the worn out or cracked portions of the wheels to prolong their useful life.

Japanese Patent No. JP2007050446A to Wataru et al. discloses a method of repairing weld cracks using Inconel 690 alloy. In particular, the '446 patent discloses adding a rare earth material such as lanthanum (La) to a filler material including Inconel 690 alloy. The '446 patent discloses that lanthanum in an amount of 0.02 to 0.03% by weight may be added to the filler material to prevent cracking of the welded joints during cooling.

Although the alloy disclosed in the '446 patent may help prevent cracking of the welded joints, still further improvements in the material characteristics may be possible. For example, the welded joints produced by the '446 patent may have a hardness that is significantly different from that of the base material of the component. Difference in hardness of the repaired component and mating parts may abrade the repaired component or the mating parts. The disclosed alloy of the '446 patent may not prevent precipitation of carbides at the interface of the weld material and the base material of the component. Carbide precipitation may cause the interface between the weld material and the base material to become brittle, which may lead to further cracking of the components. Components welded using the method disclosed in the '446 patent may also require additional heat treatment after the welding process to relieve stresses in the component.

The alloy of the present disclosure solves one or more of the problems set forth above and/or other problems in the art.

SUMMARY

In one aspect, the present disclosure is directed to an alloy for cladding. The alloy may include on a weight basis, about 6.2% to about 9.3% of chromium (Cr), about 3.0% to about 4.5% of iron (Fe), about 1.4% to about 2.15% of silicon (Si), about 0.5% to about 0.8% of boron (B), about 0.1% of carbon (C), and a balance of nickel (Ni) and incidental impurities.

In another aspect, the present disclosure is directed to an alloy for cladding a cast iron substrate. The alloy may include on a weight basis, about 7.75% of chromium (Cr), about 3.75% of iron (Fe), about 1.8% of silicon (Si), about 0.7% of boron (B), about 0.1% of carbon (C), and a balance of nickel (Ni) and incidental impurities.

In yet another aspect, the present disclosure is directed to a wheel. The wheel may include a hub. The wheel may also include a flange extending from the hub. The wheel may further include a cladding layer disposed on at least one portion of the flange. The cladding layer may include an alloy, which may include on a weight basis, about 6.2% to about 9.3% of chromium (Cr), about 3.0% to about 4.5% of iron (Fe), about 1.4% to about 2.15% of silicon (Si), about 0.5% to about 0.8% of boron (B), about 0.1% of carbon (C), and a balance of nickel (Ni) and incidental impurities

DETAILED DESCRIPTION

Figure 1:
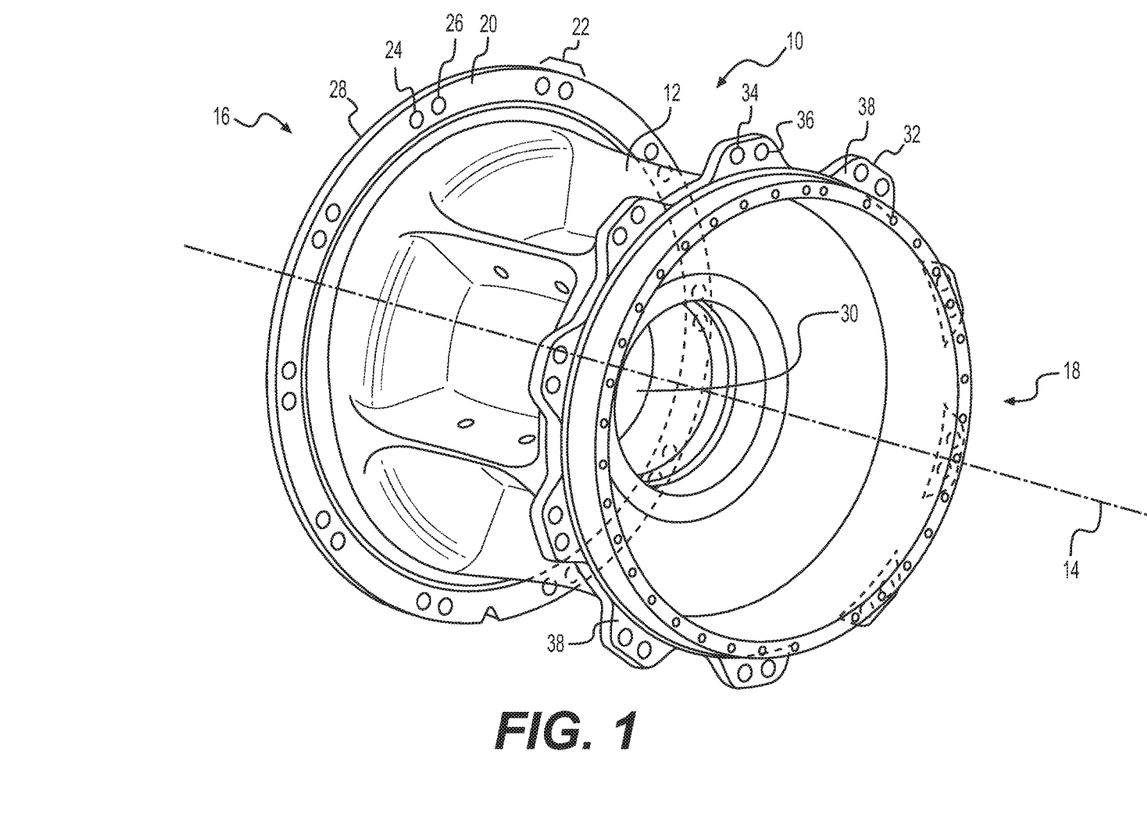
FIG. 1 is a diagrammatic illustration of an exemplary disclosed wheel.

FIG. 1 illustrates an exemplary wheel 10 of a machine (not shown). Wheel 10 may include a hub 12 disposed around an axis 14, which may be an axis of rotation of wheel 10. Hub 12 may extend from proximate end 16 to distal end 18. Flange 20 may be disposed on hub 12 adjacent proximate end 16. Flange 20 may extend radially outward from hub 12. Flange 20 may include a plurality of hole pairs 22 disposed circumferentially about axis 14. It is contemplated that a circumferential separation between hole pairs 22 may be uniform or non-uniform. Each hole pair may include holes 24, 26, which may be disposed adjacent each other. Holes 24 and 26 may have the same or different diameters. Holes 24, 26 may be configured to receive fasteners (not shown) to attach wheel 10 to a rim (not shown) of a tire (not shown) attached to wheel 10. It is also contemplated that in some exemplary embodiments, instead of hole pairs 22, flange 20 may have only holes 24 or holes 26 disposed circumferentially about axis 14. Flange 20 may have a surface 28, which may abut a surface of the rim of the tire. During operation of wheel 10, surface 28 may be subject to wear. It is contemplated that flange 20 may develop one or more cracks extending from surface 28 into flange 20. Wheel 10 may include a central bore 30, which may extend through hub 12. An axle (not shown) of the machine may be received in central bore 30.

As also illustrated in FIG. 1, wheel 10 may include tabs 32 disposed adjacent distal end 18 of wheel 10. Tabs 32 may be arranged circumferentially around axis 14. Although tabs 32 are illustrated as uniformly spaced around axis 14 in the exemplary embodiment of FIG. 1, it is contemplated that a circumferential spacing between tabs 32 may be uniform or non-uniform. Each tab 32 may have holes 34, 36, which may be configured to attach wheel 10 to a rim (not shown) of a tire (not shown) attached to wheel 10. Holes 34 and 36 may have the same or different diameters. It is also contemplated that in some exemplary embodiments, each tab 32 may have only hole 34 or only hole 36. Holes 34, 36 may be configured to receive fasteners (not shown) to attach wheel 10 to a rim (not shown) of a tire (not shown) attached to wheel 10. Thus, wheel 10 may support one tire adjacent the proximate end and another tire adjacent the distal end. Tab 32 may also include tab surface 38, which may abut a rim of a tire attached to wheel 10. During operation of wheel 10, tab surface 38 may be subject to wear. It is contemplated that tab 32 may develop one or more cracks extending from surface 38 into tabs 32.

Figure 2A:
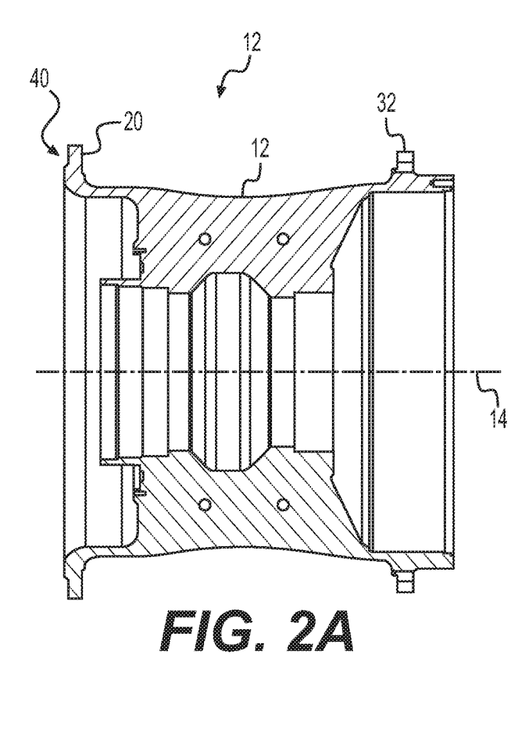
FIG. 2A is a diagrammatic illustration of a cross-sectional view of the wheel of FIG. 1.

Worn out surfaces 28, 38, or any cracks in flange 20 or tabs 32 may be repaired by filling and/or cladding worn out surfaces 28, 38 using an exemplary disclosed alloy 60. FIG. 2A illustrates a cross-sectional view of wheel 10. As illustrated in FIG. 2A, flange 20 includes a worn out portion 40. Worn out portion 40 may extend radially outward from hub 12. It is contemplated, however, that worn out portion may have any length and may or may not extend across an entire radial length of flange 20. Although not shown in FIG. 2A, worn out portion 40 may extend over some portion or all of a circumference of flange 20.

Figure 2B:
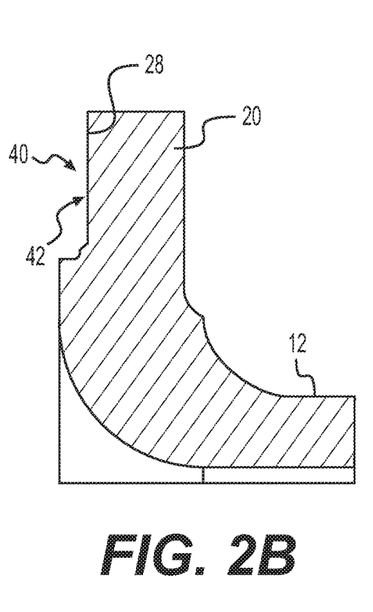
FIG. 2B is a diagrammatic illustration of a worn out flange of the wheel of FIG. 2A.
Figure 2C:
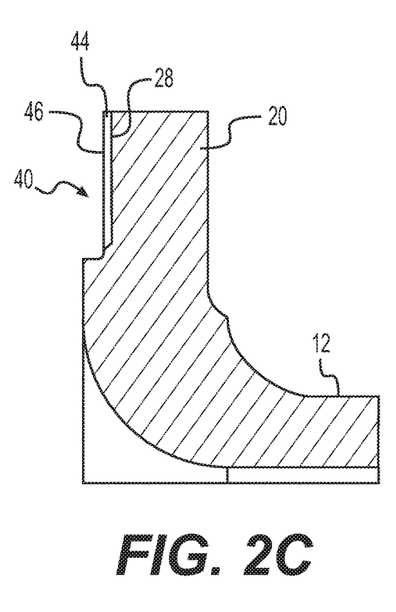
FIG. 2C is a diagrammatic illustration of the flange of FIG. 2B repaired, using an exemplary disclosed alloy.

FIG. 2B illustrates a magnified view of worn out portion 40. As illustrated in FIG. 2B, worn out portion 40 may include a notch 42 in flange 20. As illustrated in the exemplary embodiment of FIG. 2B, notch 42 may extend radially in flange 20. It is contemplated, however, that notch 42 may extend only partially over surface 28. It is also contemplated that notch 42 may extend only over a portion of a circumference of flange 20. Notch 42 may make it difficult to assemble flange 20 to a rim of a tire. FIG. 2C illustrates worn out portion 40 of flange 20 with a cladding layer 44 of alloy 60. As illustrated in FIG. 2C, cladding layer 44 may fill notch 42, helping to provide a flat surface 46 for assembly with a mating surface (not shown) of the rim of the tire.

Figure 3:
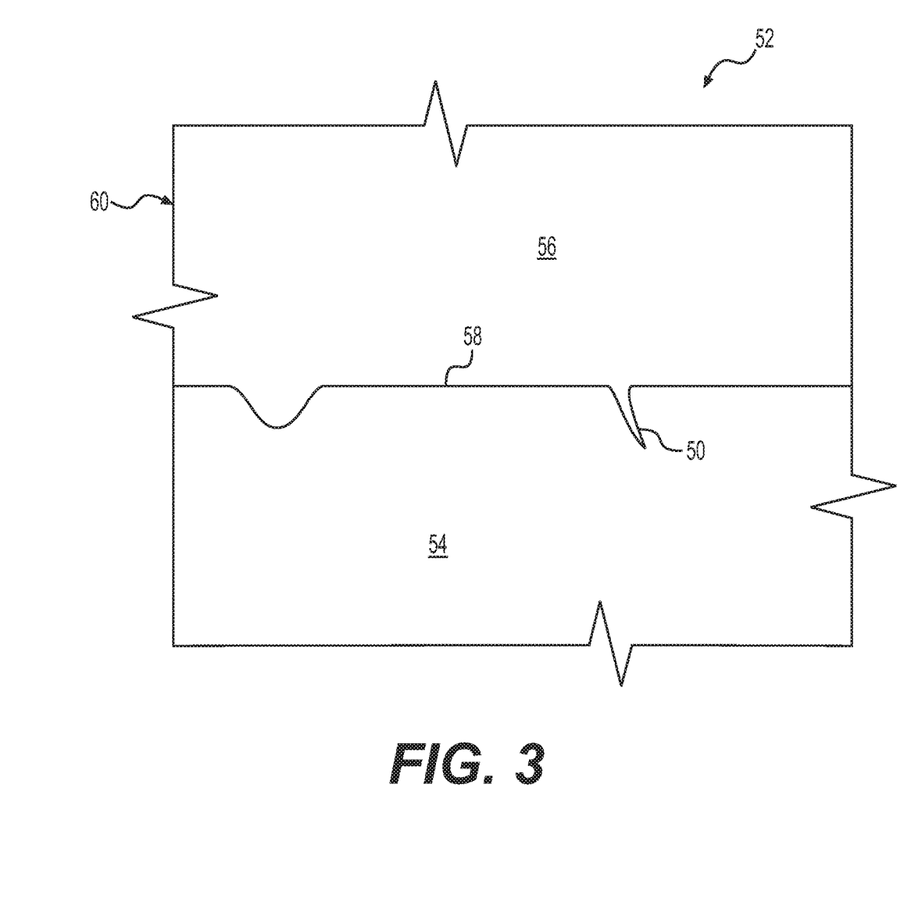
FIG. 3 is a diagrammatic illustration of a portion of the wheel of FIG. 1 clad with the exemplary disclosed alloy.

FIG. 3 illustrates a portion 52 of flange 20. It is contemplated however, that portion 52 may be a portion of any part of wheel 10. For example, portion 52 may be a portion of tabs 32 or hub 12. Portion 52 may include base material 54, which may also be referred to as a substrate. Base material 54 may include crack 50. Although only one crack 50 is illustrated in FIG. 3, it is contemplated that portion 52 may have more than one crack 50. An exemplary disclosed alloy 60 may be used to fill crack 50 and cover or clad base material 54 with cladding layer 56.

In one exemplary embodiment, a composition of alloy 60 may be determined by adjusting the amounts of various constituent elements of alloy 60, for example, chromium (Cr), iron (Fe), silicon (Si), boron (B), carbon (C), nickel (Ni), etc. In one exemplary embodiment, a composition of alloy 60 may be selected so that alloy 60 may have a hardness, which may be about equal to that of base material 54. In another exemplary embodiment, the composition of alloy 60 may be selected so that alloy 60 may have a Rockwell hardness ranging between about HRC 25 and about HRC 40, which may be about equal to a Rockwell hardness of base material 54. The composition of alloy 60 may also be selected so that precipitation of carbides at an interface 58 between base material 54 and cladding 56 may be reduced or eliminated. The composition of alloy 60 may also be selected so that a potential for formation of defects such as pores and/or cracks, adjacent interface 58 between base material 54 and cladding 56, may be reduced or eliminated. Although formation of a martensitic phase in the alloy contributes to mechanical strength, untempered martensite tends to be brittle and may promote the formation of cracks between alloy 60 and base material 54. Therefore, an amount of the martensite formation in cladding layer 56 must be controlled to ensure that cladding layer 56 has adequate mechanical strength without promoting cracking.

Table 1 below lists the chemical composition of an exemplary disclosed alloy 60. The disclosed composition may help ensure that the alloy cladding has a hardness about equal to that of the underlying substrate, while reducing or eliminating precipitation of carbides at the interface of the alloy and the underlying substrate. The disclosed composition may also help ensure that no cracks are formed at interface 58 between base material 54 and cladding layer 56.

TABLE 1

Composition of exemplary disclosed high temperature alloys in weight percent.

| Constituent | Alloy 60 Weight % |
| --- | --- |
| Chromium (Cr) | 6.2-9.3 |
| Iron (Fe) | 3.0-4.5 |
| Silicon (Si) | 1.4-2.1 |
| Boron (B) | 0.5-0.8 |
| Carbon | about 0.1 |
| Nickel (Ni) + Impurities | Balance |

Table 2 below compares the composition of an exemplary alloy 60 consistent with this disclosure with comparative examples CE1, CE2, CE3, and CE4, which may represent conventional alloys used for repairing cast iron components. The disclosed composition for alloy 60 may help ensure that the alloy cladding has a hardness about equal to that of the underlying substrate, while reducing or eliminating precipitation of carbides at the interface of the alloy and the underlying substrate. The disclosed composition may also help ensure that no cracks are formed at interface 58 between base material 54 and cladding layer 56.

TABLE 2

Comparison of an exemplary disclosed alloy composition with compositions of conventional alloys.

| | | Comparative Examples (Conventional Alloys) | | | |
| --- | --- | --- | --- | --- | --- |
| Constituent | Alloy 60 Weight % | CE1 Weight % | CE2 Weight % | CE3 Weight % | CE4 Weight % |
| Chromium (Cr) | 7.75 | 1.6 | 3.9 | 11.6 | 1 |
| Iron (Fe) | 3.75 | 0.8 | 1.9 | 5.6 | 6.8 |
| Silicon (Si) | 1.8 | 3.2 | 2.6 | 0.9 | 0.4 |
| Boron (B) | 0.7 | 1.2 | 1.0 | 0.3 | 0.1 |
| Carbon (C) | 0.1 | 0.1 | 0.1 | 0.1 | 0.0 |
| Nickel (Ni) + Impurities | Balance | Balance | Balance | Balance | Balance |

Table 3 below compares properties of the exemplary disclosed alloy 60 listed in Table 2 with properties of the comparative examples CE1, CE2, CE3, CE4, listed in Table 2. The properties listed in Table 3 were obtained by cladding a cast iron substrate (base material 54), using each of the alloy compositions listed in Table 2. The Rockwell hardness (HRC) of base material 54 ranged between about 25 HRC and 40 HRC. Measurements of hardness were made at multiple locations and multiple depths on the clad samples. Cross-sections of the clad samples were also examined to determine the formation of pores, cracks, and/or carbides.

TABLE 3

Comparison of properties of a disclosed alloy composition with properties of conventional alloys disclosed in Table 2.

| Property | Alloy 1a | Comparative Examples (Conventional Alloys) | | | |
|---|---|---|---|---|---|
| | | CE1 | CE2 | CE3 | CE4 |
| Rockwell Hardness (HRC) | 25-40 | >50 | >50 | >50 | >50 |
| Carbide formation | Very Little | Very Little | Very Little | Significant | Significant |
| Cladding Defects (pores, cracks etc.) | None | Interfacial cracks | Interfacial cracks | Interfacial cracks | Cracking of clad layer |

Figure 4A:
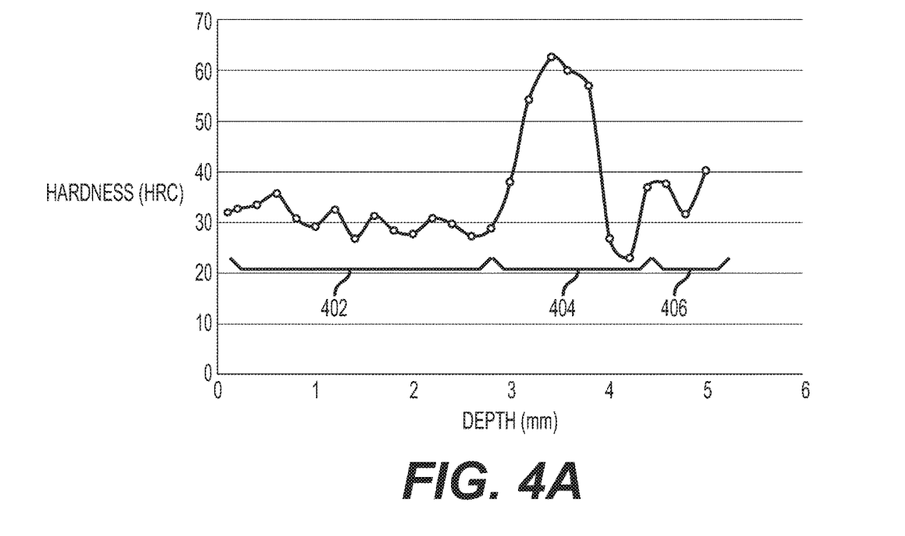
FIG. 4A is a pictorial illustration of a graph of Rockwell hardness at different depths in a sample of cast iron clad with the exemplary disclosed alloy.

As illustrated in Table 3 all four comparative examples (CE1, CE2, CE3, and CE4) form a cladding layer having a Rockwell hardness of more than 50 HRC. In contrast, disclosed alloy 60 produces a cladding layer 56 with a Rockwell hardness ranging between about 25 HRC and about 40 HRC, which is about equal to a Rockwell hardness of base material 54. FIG. 4A illustrates exemplary hardness measurements on a cast iron sample clad with alloy 60. In FIG. 4A, portion 402 of the graph represents cladding layer 56, portion 404 represents a heat affected zone, and portion 406 represents base material 54. The cladding process may use processes such as laser cladding, MIG welding, or other cladding processes known in the art. During the cladding process, alloy 60 may be melted and the molten alloy 60 may be deposited in crack 50 and over base material 54 to form cladding layer 56. At least some of the heat may conduct from interface 58 into base material 54. The portion of base material 54 in which the temperature increases by more than 10% of an initial temperature of base material 54 is called a heat affected zone (HAZ). As illustrated in FIG. 4A, a Rockwell hardness of cladding layer 56 ranges between about 28 HRC and 39 HRC. As illustrated in FIG. 4A, a hardness of base material 54 outside portion 404 (the HAZ) ranges between about 29 HRC and about 40 HRC, which is about equal to the hardness of cladding layer 56.

Figure 4B:
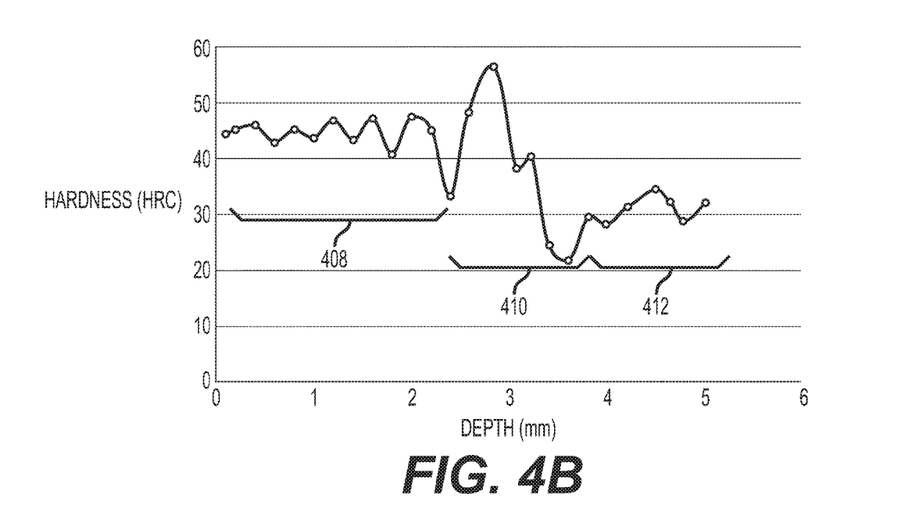
FIG. 4B is a pictorial illustration of a graph of Rockwell hardness at different depths in a cast iron sample clad with a conventional alloy.

FIG. 4B illustrates exemplary hardness measurement on a cast iron sample clad with a conventional alloy of comparative example CE1. In FIG. 4B, portion 408 of the graph represents cladding layer 56, portion 410 represents the heat affected zone, and portion 412 represents base material 54. As illustrated in FIG. 4B, a Rockwell hardness of cladding layer 56, produced with a conventional alloy like CE1, ranges between about 40 HRC and about 62 HRC, which is significantly higher than a Rockwell hardness of base material 54 of about 30 HRC to 39 HRC. Thus, the conventional alloy of comparative example CE1 produces a cladding layer 56, which may have a significantly higher hardness than base material 54. Such a hard cladding layer 56 may abrade mating parts that may come into contact with cladding layer 56.

Figure 5A:
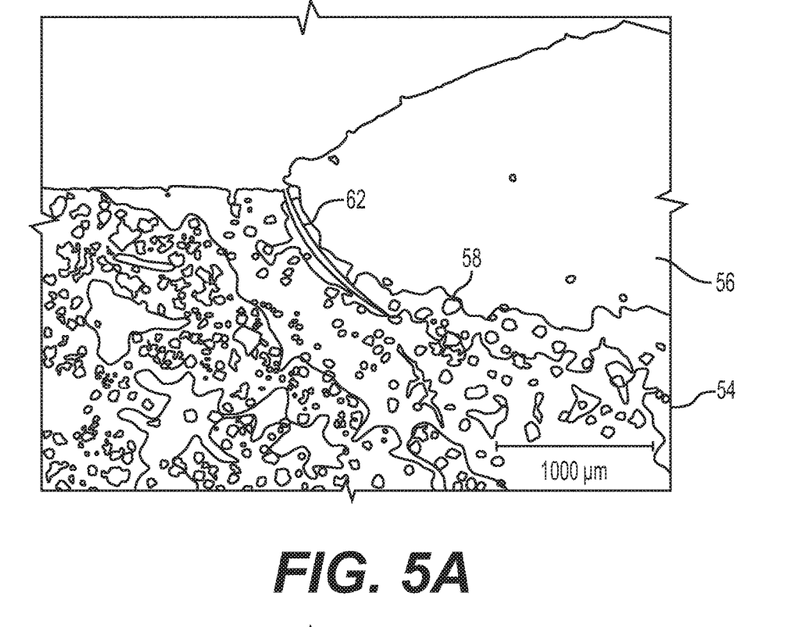
FIG. 5A is a sectional view of a cast iron sample clad with a conventional alloy.

Returning to Table 3, alloy 60 and comparative examples CE1 and CE2 showed minor amounts of precipitation of carbides adjacent interface 58. However, the alloy compositions of comparative examples CE3 and CE4 included significant amounts of carbide precipitation adjacent interface 58. As discussed above, excessive carbide precipitation may make cladding layer 56 brittle and prone to cracking, which in turn may reduce a useful life of a repaired component. As also illustrated in Table 3, no interfacial cracks or pores were seen in the cross-sections taken from the sample clad with alloy 60. In contrast, the samples clad with the alloy compositions CE1, CE2, and CE3 all showed interfacial cracks between cladding 56 and base material 54. FIG. 5A illustrates an exemplary section of a cast iron sample in which cladding layer 56 is made using a conventional alloy having a composition of any of the comparative examples CE1, CE2, or CE3. As seen in FIG. 5A, a crack 62 forms at interface 58 between base material 54 and cladding layer 56. Such cracks may grow when a component with portion 52 is subjected to cyclical stresses generated during operation of a machine. Growth of cracks 62 may significantly reduce a useful life of the component with portion 52 repaired using a conventional alloy having a composition similar to those of comparative examples CE1, CE2, or CE3.

Figure 5B:
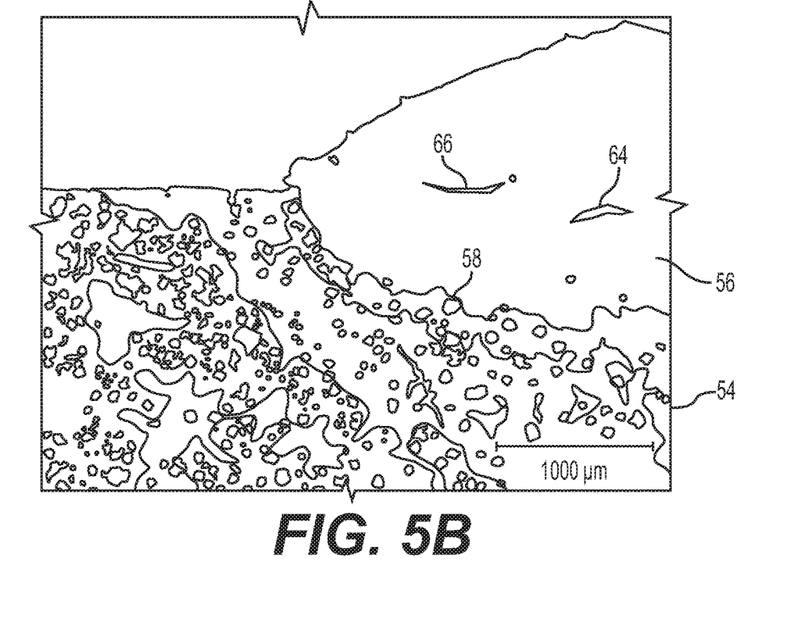
FIG. 5B is a sectional view of a cast iron sample clad with another conventional alloy.

FIG. 5B illustrates an exemplary section of a cast iron sample in which cladding layer 56 is made using a conventional alloy having a composition of comparative example CE4. As seen in FIG. 5B, there is no crack formation at interface 58. However, cladding layer 56 may include tears 64 and/or cracks 66 within cladding layer 56. Tears 64 and/or cracks 66 in cladding layer 56 may grow when the component with portion 52 is subjected to cyclical stresses generated during operation of a machine. Growth of tears 64 and/or cracks 66 within cladding layer 56 may significantly reduce a useful life of the component with portion 52 repaired using a conventional alloy having a composition similar to that of comparative example CE4.

Thus, the composition of alloy 60 disclosed in Tables 1 and 2 provides a cladding material that has a Rockwell hardness of about 25 HRC to about 40 HRC, which is about equal to a Rockwell hardness of base material 54 of the component with portion 52. Additionally, the composition of alloy 60 disclosed in Tables 1 and 2 provides a cladding layer 56 with no interfacial cracks at interface 58 between base material 54 and cladding layer 56, and little to no carbide formation adjacent interface 58. Further, the composition of alloy 60 disclosed in Tables 1 and 2 provides a cladding layer in which there are no tears or crack within cladding layer 56.

INDUSTRIAL APPLICABILITY

The exemplary disclosed alloy 60 may provide a material for repairing damaged or cracked machine components like wheel 10. In particular, the disclosed alloy compositions may afford a cladding layer 56 having a hardness, which may be about equal to a hardness of the cast iron material of wheel 10. Further, the disclosed alloy compositions may be less prone to precipitation of harmful carbides in cladding layer 56. The disclosed alloy compositions may also help reduce or eliminate the formation of interfacial cracks 62, tears 64, and/or cracks 66 within cladding layer 56, which may improve the mechanical strength and fatigue life of wheel 10 repaired using alloy 60.

A further advantage of alloy 60 may be the concomitant reductions in manufacturing cost. In particular, the use of conventional alloys for repairing cast iron components often requires pre-heating of the cast iron components before the repair process, and a post-repair annealing to relieve the stresses in the repaired components. These additional steps of pre-heating and post-annealing add time and cost to the repair process. In contrast, the disclosed alloy 60 require a relatively low amount of local heat input for melting and depositing alloy 60 on to base material 54. In particular, the composition of alloy 60 has melting temperature that ranges between about 980° C. and 1200° C. In contrast the melting temperature of conventional alloys ranges between about 1300° C. and 1400° C. Because of the relatively lower melting point of alloy 60, the repair process, using alloy 60, does not require base material 54 to be pre-heated. Furthermore, because the amount of heat input with disclosed alloy 60 is lower than that with conventional alloy materials, there is no need for any post-repair annealing. By eliminating the pre-heating and post-repair annealing steps, the disclosed alloy 60 significantly reduces both the time required to complete the repair process and the cost of performing the repair.

Although the above discussion refers to repair of hub 12, flange 20, or tabs 32 of wheel 10, it is contemplated that the disclosed alloy 60 may be used to repair other machine components. For example, engine blocks, cylinder heads, turbocharger housings, and many other components of a machine may be made out of cast iron. It is contemplated that worn out portions (e.g. notch 42) or cracks 50 in one or more of these other machine components may also be repaired by filling notch 42 and/or cracks 50, and/or cladding worn out portions 40 of these machine components with the disclosed alloy 60.

It will be apparent to those skilled in the art that various modifications and variations can be made to the disclosed alloy without departing from the scope of the disclosure. Other embodiments of the disclosed alloy will be apparent to those skilled in the art from consideration of the specification and practice of the alloy disclosed herein. It is intended that the specification and examples be considered as exemplary only, with a true scope of the disclosure being indicated by the following claims and their equivalents.

What is claimed is:

1. An alloy for cladding cast iron, comprising, on a weight basis:
    Cr: 6.2-9.3 wt %,
    Fe: 3.0-4.5 wt %,
    Si: 1.4-2.1 wt %,
    B: 0.5-0.8 wt %,
    C: about 0.1 wt %, and
    a balance of Ni and incidental impurities.

2. The alloy of claim 1, wherein a hardness of the alloy ranges between Rockwell hardness of about HRC 25 to about HRC 40.

3. The alloy of claim 1, wherein a melting point of the alloy ranges between about 980° C. and 1200° C.

4. The alloy of claim 1, wherein Cr is about 7.75 wt %.

5. The alloy of claim 4, wherein Fe is about 3.75 wt %.

6. The alloy of claim 5, wherein Si is about 1.8 wt %.

7. The alloy of claim 6, wherein B is about 0.7 wt %.

8. An alloy for cladding a cast iron substrate, comprising, on a weight basis:
    Cr: about 7.75 wt %,
    Fe: about 3.75 wt %,
    Si: about 1.8 wt %,
    B: about 0.7 wt %,
    C: about 0.1 wt %, and
    a balance of Ni and incidental impurities.

9. The alloy of claim 8, wherein a hardness of the alloy ranges between Rockwell hardness about HRC 25 to about HRC 40.

10. A cast iron wheel, comprising:
    a hub;
    a flange extending from the hub; and
    a cladding layer disposed on at least one worn out portion of the flange to repair the worn out portion, the cladding layer including an alloy having, on a weight basis:
        Cr: 6.2-9.3 wt %,
        Fe: 3.0-4.5 wt %,
        Si: 1.4-2.1 wt %,
        B: 0.5-0.8 wt %,
        C: about 0.1 wt %, and
        a balance of Ni and incidental impurities.

11. The wheel of claim 10, wherein Cr in the alloy is about 7.75 wt %.

12. The wheel of claim 11, wherein Fe in the alloy is about 3.75 wt %.

13. The wheel of claim 12, wherein Si in the alloy is about 1.8 wt %.

14. The wheel of claim 13, wherein B in the alloy is about 0.7 wt %.

15. The wheel of claim 10, wherein a first hardness of the cladding layer is about equal to a second hardness of the cast iron at an interface of the cladding layer and the cast iron of the flange.

16. The wheel of claim 15, wherein the first hardness and the second hardness ranges between Rockwell hardness about HRC 25 to about HRC 40.

17. The wheel of claim 15, wherein there is little to no carbide formation at the interface of the cladding layer and the cast iron of the flange.

* * * * *